United States Patent
Stedman

[11] 3,944,297
[45] Mar. 16, 1976

[54] ADJUSTABLE SPROCKET DRIVE FOR TRACK-TYPE VEHICLES AND METHOD FOR USING THE SAME

[75] Inventor: Robert N. Stedman, Chillicothe, Ill.
[73] Assignee: Caterpillar Tractor Co., Peoria, Ill.
[22] Filed: Nov. 29, 1974
[21] Appl. No.: 528,365

[52] U.S. Cl.................. 305/57; 74/243 DR; 74/448
[51] Int. Cl.²......................................... B62D 55/20
[58] Field of Search.......... 74/446, 447, 448, 243 R, 74/243 DR; 305/39.56, 57.58; 180/9.62

[56] References Cited
UNITED STATES PATENTS

| | | | |
|---|---|---|---|
| 1,433,923 | 10/1922 | Anthony | 74/448 |
| 3,106,101 | 10/1963 | Harriman | 74/243 DR |
| 3,357,750 | 12/1967 | Reynolds | 305/58 |
| 3,359,044 | 12/1967 | Boggs | 305/57 |
| 3,439,551 | 4/1969 | Militana | 74/448 |
| 3,680,928 | 8/1972 | Kraschnewski | 305/57 |

*Primary Examiner*—Philip Goodman
*Attorney, Agent, or Firm*—Phillips, Moore, Weissenberger, Lempio & Strabala

[57] ABSTRACT

A track-type vehicle comprises a pair of endless track assemblies including a plurality of articulated track shoes. A drive sprocket, engaged with the track assembly for driving the same, comprises a pair of laterally spaced annular support members and a toothed sprocket member detachably mounted on an outboard side of each of the support members. The sprocket members may be detached from the support members and attached to inboard sides thereof to increase the service life of drive lugs formed on the track shoes.

22 Claims, 4 Drawing Figures

ADJUSTABLE SPROCKET DRIVE FOR TRACK-TYPE VEHICLES AND METHOD FOR USING THE SAME

BACKGROUND OF THE INVENTION

Track-type vehicles, such as crawler tractors, are adapted for heavy duty work during various construction and earthworking operations. The working components thereof, such as the drive lugs secured on an endless track assembly for engagement with the teeth of a drive sprocket, are subjected to wear and require periodic repair or replacement. Such servicing normally requires a substantial "down-time" of the tractor and necessitates rather expensive repair or replacement procedures.

SUMMARY OF THE INVENTION

An object of this invention is to provide an economical drive sprocket and method for substantially increasing the service life of drive lugs employed on track shoes of a track-type vehicle. The drive sprocket comprises at least annular support member having a toothed sprocket member releasably attached to one side thereof. Upon wear of the portions of the drive lugs engaged by the teeth of the sprocket member, the sprocket member may be detached from the support member and reattached to an opposite side thereof to engage the teeth of the sprocket member with unworn portions of the lugs.

In the preferred embodiment of this invention, a pair of axially spaced support members, each having a sprocket member attached on an outside board thereof, are employed on the sprocket to adapt them for reattachment to inboard sides of the support members. Each track shoe preferably comprises a generally flat and rectangular main body portion having a single drive lug formed centrally on one end thereof and a pair of laterally spaced drive lugs formed on the other end thereof.

BRIEF DESCRIPTION OF THE DRAWINGS

Other objects of this invention will become apparent from the following description and accompanying drawings wherein.

DETAILED DESCRIPTION OF THE INVENTION

Figure 1:
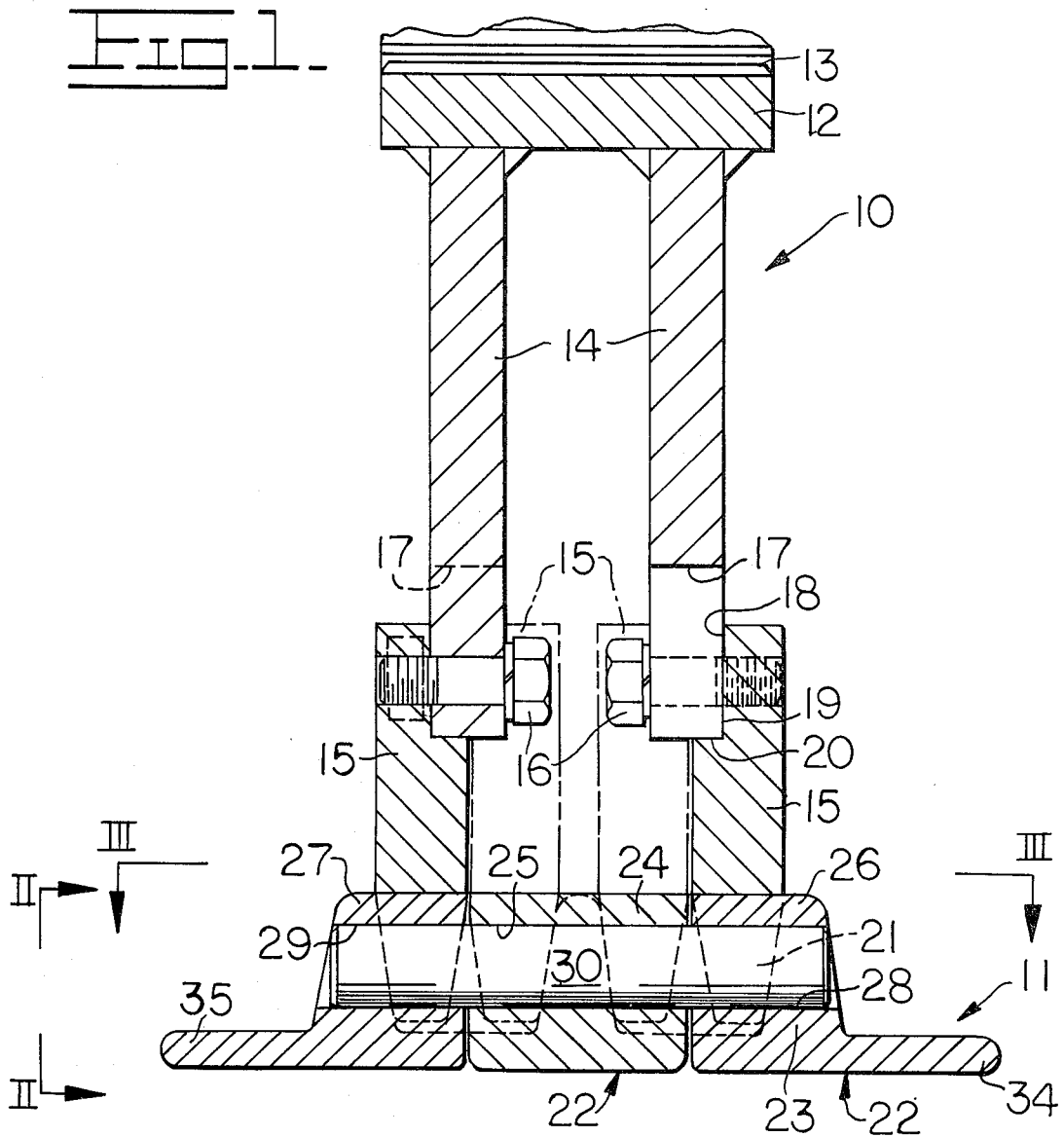
FIG. 1 is a fragmentary sectional view of the adjustable drive sprocket of this invention engaged with a common drive lug formed on a pair of articulated track shoes of an endless track assembly for a track-type vehicle.

FIG. 1 illustrates an adjustable drive sprocket 10 of this invention engaged with a partially illustrated track assembly 11 of a track-type vehicle. In conventional practice, a pair of such endless track assemblies are mounted on either side of the vehicle and are each driven by means of a drive sprocket. The drive sprocket, disposed for rotation about a central axis thereof, comprises a cylindrical hub 12 adapted for attachment to a drive shaft of the vehicle (not shown) at a spline connection 13.

A pair of annular support members or plates 14 are secured to the hub to extend radially outwardly therefrom. A sprocket member 15 is secured to an outboard side of each of the support members by a plurality of circumferentially disposed fastening means, such as bolts 16. The outer peripheries of the support members are scalloped to form openings 17 circumferentially therearound to provide access to the heads of bolts 16.

A recess 18, formed on a sidewall of the sprocket member, is disposed in nesting relationship on contiguous outer wall portion 19 and outer end portion 20 of the support member. The sprocket member extends radially outwardly from the support member and terminates at a plurality of circumferentially disposed teeth 21. It should be understood that each of the sprocket members may constitute a unitary annular structure or may be constituted by a plurality of arcuate segments each individually attached to a respective support member.

Figure 3:
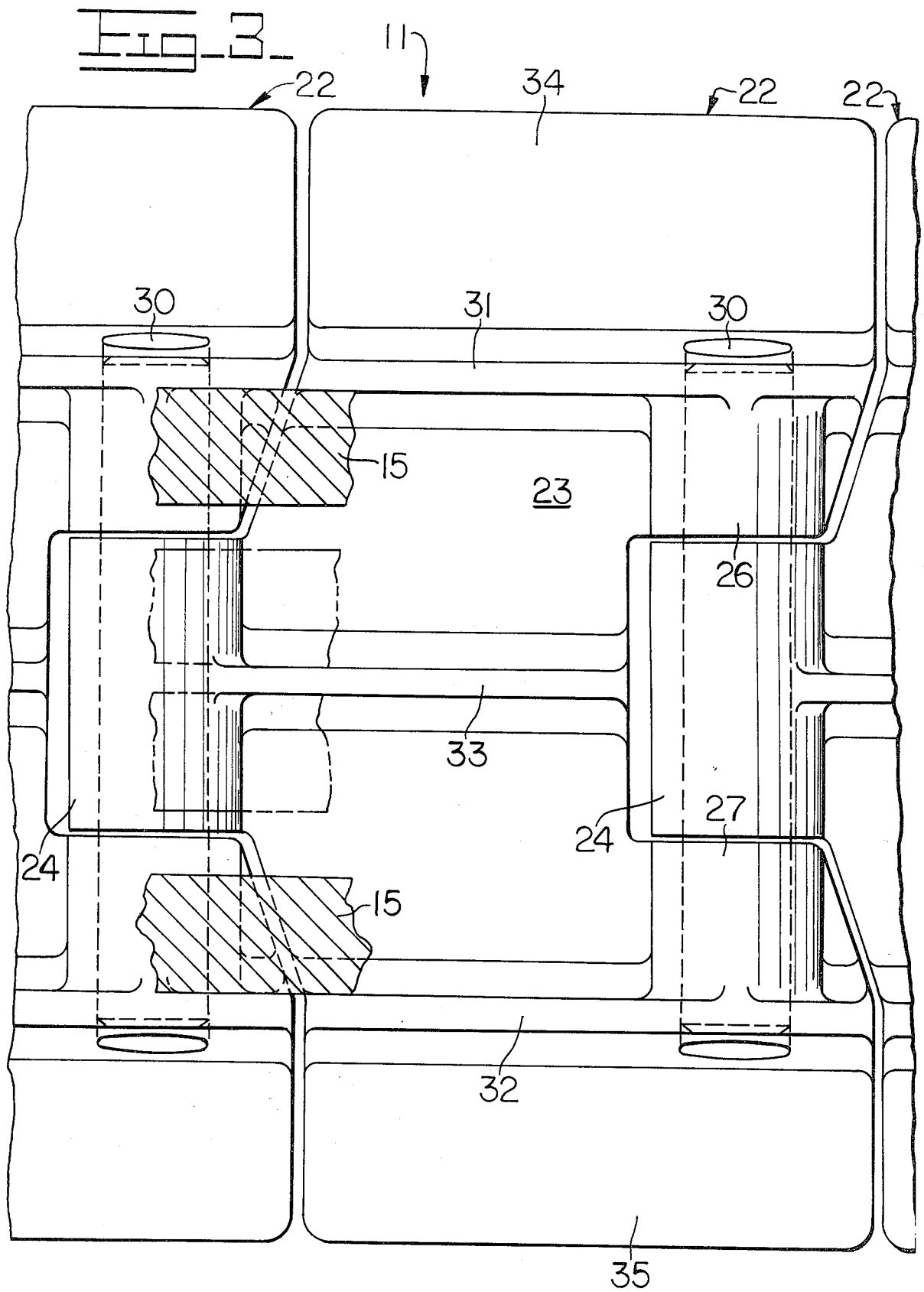
FIG. 3 is an enlarged top plan view of the track assembly, taken in the direction of arrows III—III in FIG. 1.
Figure 4:
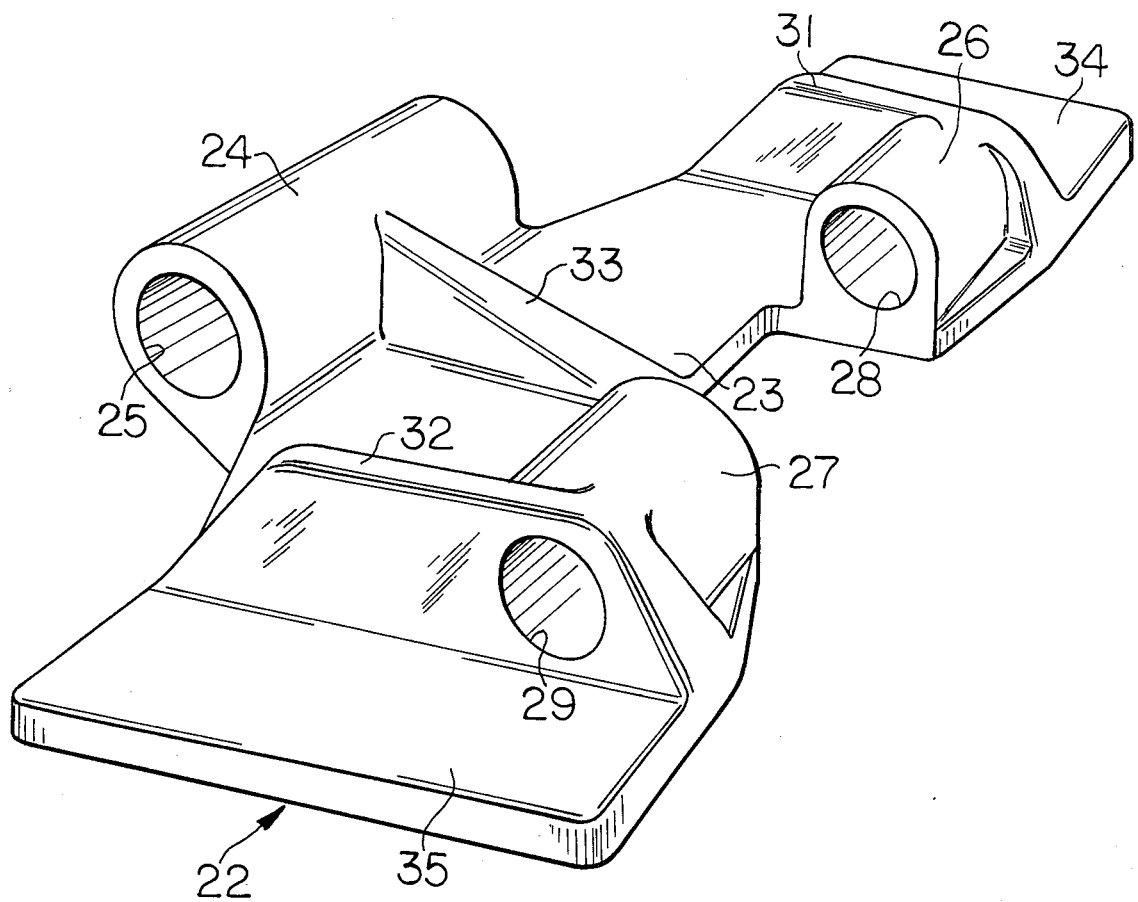
FIG. 4 is an isometric view of a track shoe employed in the track assembly.

Referring to FIGS. 3 and 4, the endless track assembly comprises a plurality of articulated ground-engaging track shoes 22 each comprises a generally flat and rectangular main body portion 23. A single combined drive and hinge lug 24 is formed centrally on a first end of the main body portion and has a bore 25 formed axially therethrough. A pair of combined drive and hinge lugs 26 and 27 are formed in laterally spaced relationship on a second end of the main body portion in parallel relationship relative to lug 24.

Bores 28 and 29 are formed through lugs 26 and 27, respectively, in aligned relationship with each other and with bores 25 when a pair of circumferentially adjacent shoes are attached together by a cylindrical pin 30 disposed therein. The outboard ends of the pin may be press-fitted or otherwise suitably secured within bores 28 and 29 whereas bore 25 of lug 24 may be suitably sized to permit pin 30 to pivot therein. It should be noted in FIG. 1 that lugs 26 and 27 are separated by a lateral distance slightly greater than the lateral width of lug 24 to adapt the outer pair of lugs for the reception of lug 24 and to permit relative pivotal movement therebetween.

Figure 2:
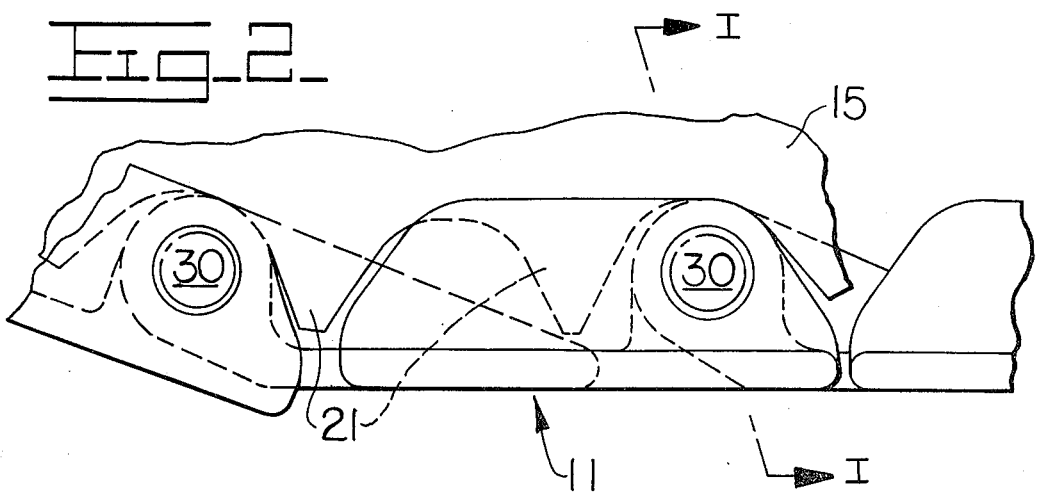
FIG. 2 is a partial side elevational view of the track assembly showing the engagement of the drive sprocket therewith, taken in the direction of arrows II—II in FIG. 1.

Referring to FIGS. 2 and 4, each lug 24, 26 and 27 extends upwardly from main body portion 23 to terminate at arcuate upper surface portions to provide a compatible bearing surface which meshes with the generally like-shaped recess formed between each pair of sprocket teeth 21. Each lug further comprises a pair of sidewall portions which converge upwardly from main body portion 23 to merge in tangential relationship with a respective bearing surface. As further shown in FIGS. 3 and 4, the track shoe further comprises a pair of laterally spaced and parallel outer guide means or raised ridges 31 and 32 and an intermediate guide means or raised ridge 33 disposed between and parallel to the outer guide means.

The guide means are formed on main body portion 23 to extend in perpendicular relationship between lug 24 and lugs 26 and 27 of each track shoe. When sprocket members 15 are attached to an outboard side of the support members, as shown in FIGS. 1 and 3, outer guide means 31 and 32 will each be disposed closely adjacent to an outboard side of a respective sprocket member to inhibit lateral movements of the endless track assembly relative to the drive sprocket.

As will be hereinafter more fully described, sprockets 15 are adapted to be reattached to the inboard sides of support members 14, as indicated by phantom lines in FIGS. 1 and 3, whereby intermediate guide means 33 is disposed between the sprocket members. Each track shoe further comprises a pair of flat outboard portions 34 and 35 each extending laterally outwardly from a respective one of guide means 31 and 32 to provide the track shoe with low ground pressure capabilities.

The adjustable drive sprocket and method teachings of this invention provide for a substantial increase in the service life of drive lugs 24, 26 and 27. In particular, when the vehicle has been placed in operation over a substantial period of time to induce wear at lugs 26 and 27, the steps of such method are carried forth by initially detaching sprocket members 15 from support members 14 by releasing bolts 16. The sprocket members are thus removed from the outboard sides of the support members and disengaged from a first location on the drive lug, i.e., at lugs 26 and 27. The next step is one of attaching the sprocket members to the inboard sides of the support members with bolts 16, as indicated by phantom lines in FIG. 1. The drive teeth of the sprocket members will thus be disposed in circumferential alignment with lug 24, on either side of guide means 33, to provide an unworn bearing surface for the sprocket teeth. By alternately adjusting the lateral relationship of the coacting members new sprocket and shoe, drive surfaces are simultaneously brought into engagement.

I claim:

1. In a track-type vehicle of the type comprising a drive sprocket disposed for rotation about a central axis thereof and engaged with a drive lug secured on a track shoe of an endless track assembly, the improvement wherein said drive sprocket comprises an annular support member defining a mounting surface on each of the outboard and inboard sides thereof, a toothed sprocket member and means releasably attaching said sprocket member on only one of the outboard and inboard sides of said support member and for selectively attaching said sprocket member on the other one of said outboard and inboard sides of said support member, said sprocket member being disposed on said support member to extend radially outwardly from said one side and being spaced axially from the other side of the outboard and inboard sides of said support member.

2. The vehicle of claim 1 wherein said means comprises a plurality of bolts circumferentially disposed about said support member and threadably attaching said sprocket member thereto.

3. The vehicle of claim 1 further comprising means forming a recess on a sidewall of said sprocket member disposed in nesting relationship on contiguous outer wall and outer end portions of said support member.

4. The vehicle of claim 1 wherein said sprocket member constitutes a unitary annular structure.

5. The vehicle of claim 1 wherein said sprocket member constitutes a plurality of arcuate segments each individually attached to said support member.

6. The vehicle of claim 1 wherein said drive sprocket further comprises a hub and wherein said support member comprises an annular plate secured to said hub and extending radially outwardly therefrom.

7. The vehicle of claim 1 wherein said drive sprocket comprises a pair of axially spaced support members each having a said sprocket member attached on a respective one of the outboard and inboard sides thereof.

8. The vehicle of claim 7 wherein each of said sprocket members is attached on an outboard side of a respective support member.

9. The vehicle of claim 7 wherein each of said sprocket members is attached on an inboard side of a respective support member.

10. The vehicle of claim 8 wherein each of said track shoes comprises a pair of laterally spaced guide means secured thereon and positioned closely adjacent to an outboard side of a respective one of said sprocket members.

11. The vehicle of claim 9 wherein each of said track shoes comprises a single guide means secured centrally thereon and positioned closely adjacent to an inboard side of each of said sprocket members.

12. The vehicle of claim 1 wherein each of said track shoes is generally rectangular and comprises a single hinge lug formed centrally on a first end thereof and a pair of laterally spaced hinge lugs formed on a second, opposite end thereof, the single hinge lug of one track shoe disposed in lateral alignment between the pair of hinge lugs formed on a circumferentially adjacent shoe and pivotally connected thereto.

13. The vehicle of claim 12 wherein teeth of each of said sprocket members are aligned circumferentially with a respective one of said pair of lugs of a respective track shoe for driving engagement therewith.

14. The vehicle of claim 12 wherein teeth of each of said sprocket members are aligned circumferentially with said single lug of a respective track shoe for driving engagement therewith.

15. A ground engaging track shoe adapted for use in an endless track assembly of a track-type vehicle comprising
 a generally flat and rectangular main body portion,
 a single combined drive and hinge lug formed centrally on a first end of said main body portion and having a bore formed axially therethrough, and
 a pair of combined drive and hinge lugs formed in laterally spaced relationship on a second end of said main body portion in parallel relationship relative to said single lug and having aligned bores formed therethrough, said pair of lugs separated by a distance slightly greater than the lateral width of said single lug to adapt said pair of lugs for reception of the single lug of another track shoe in aligned relationship therebetween, each of said lugs extending upwardly from said main body portion to terminate at an arcuate portion at its apex.

16. The track shoe of claim 15 wherein each of said lugs further comprises a pair of sidewall portions converging upwardly from said main body portion to merge in tangential relationship with said arcuate portion.

17. The track shoe of claim 15 further comprising a pair of laterally spaced and parallel guide means and an intermediate guide means disposed between and parallel to said pair of guide means, each of said guide means formed on said main body portion to extend in perpendicular relationship between said single lug and said pair of lugs.

18. The track shoe of claim 17 wherein said main body portion further comprises a pair of flat portions each extending laterally outwardly from a respective one of said pair of guide means.

19. A method for increasing the service life of a drive lug secured on a track shoe employed in an endless track of a track-type vehicle wherein a tooth carrying sprocket member, detachably mounted on a first side of a support member, engages said drive lug at a first location thereon to drive said track assembly, said method comprising the steps of detaching said sprocket member from the first side of said support member to disengage a tooth thereof from the first location on said drive lug, and attaching said sprocket member to a second, opposite side of said support member to engage a tooth thereof at a second location on said drive lug which is displaced laterally from the first location thereof.

20. The method of claim 19 wherein a pair of said sprocket members are each detachably mounted on an outboard side of a respective one of a laterally spaced pair of said support members and further comprising the steps of detaching said sprocket members from the outboard sides of support members, and reattaching each of said sprocket member to an inboard side of a respective one of said support members.

21. In a track-type vehicle of the type comprising a drive sprocket disposed for rotation about a central axis thereof and engaged with a drive lug secured on a track shoe of an endless track assembly, the improvement wherein said drive sprocket comprises an annular support member, a toothed sprocket member and means releasably attaching said sprocket member on only one of the outboard and inboard sides of said support member and for selectively attaching said sprocket member on the other one of said outboard and inboard sides of said support member and wherein each of said track shoes is generally rectangular and comprises a single hinge lug formed centrally on a first end thereof and a pair of laterally spaced hinge lugs formed on a second, opposite end thereof, the single hinge lug of one track shoe disposed in lateral alignment between the pair of hinge lugs formed on a circumferentially adjacent shoe and pivotally connected thereto.

22. A ground engaging track shoe adapted for use in an endless track assembly of a track-type vehicle comprising a generally flat and rectangular main body portion, a single combined drive and hinge lug formed centrally on a first end of said main body portion having a bore formed axially therethrough, a pair of combined drive and hinge lugs formed in laterally spaced relationship on a second end of said main body portion in parallel relationship relative to said single lug and having aligned bores formed therethrough, said pair of lugs separated by a distance slightly greater than the lateral width of said single lug to adapt said pair of lugs for reception of the single lug of another track shoe in aligned relationship therebetween and a pair of laterally spaced and parallel guide means and an intermediate guide means disposed between and parallel to said pair of guide means, each of said guide means formed on said main body portion to extend in perpendicular relationship between said single lug and said pair of lugs.

* * * * *